(12) United States Patent
Chen et al.

(10) Patent No.: US 12,341,650 B2
(45) Date of Patent: Jun. 24, 2025

(54) PERSONA-BASED MULTI-SCALE NETWORK RELATED DIGEST GENERATION

(71) Applicant: Cisco Technology, Inc., San Jose, CA (US)

(72) Inventors: Daniel Shan-Shea Chen, Potomac, MD (US); Pengfei Sun, Reno, NV (US); Qihong Shao, Clyde Hill, WA (US); Gurvinder P. Singh, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/457,804

(22) Filed: Aug. 29, 2023

(65) Prior Publication Data
US 2025/0080410 A1 Mar. 6, 2025

(51) Int. Cl.
*H04L 41/069* (2022.01)
*G06F 40/166* (2020.01)
(Continued)

(52) U.S. Cl.
CPC .......... *H04L 41/069* (2013.01); *G06F 40/166* (2020.01); *G06F 40/30* (2020.01); *H04L 41/0654* (2013.01); *H04L 41/16* (2013.01)

(58) Field of Classification Search
None
See application file for complete search history.

(56) References Cited

U.S. PATENT DOCUMENTS 9,787,485 B1 10/2017 Yeskel et al.
10,027,711 B2 * 7/2018 Gill ..................... H04L 63/1441
(Continued)

FOREIGN PATENT DOCUMENTS

WO WO-2004084038 A2 * 9/2004 ............. H04L 41/00
WO WO-2011009892 A1 * 1/2011 .......... G06F 11/3409
(Continued)

OTHER PUBLICATIONS

Campaign Monitor, "Email Marketing Terms," retrieved from https://www.campaignmonitor.com/resources/glossary/segmentation/, May 12, 2023, 5 pages.
(Continued)

*Primary Examiner* — Sandarva Khanal
(74) *Attorney, Agent, or Firm* — Edell, Shapiro & Finnan, LLC

(57) ABSTRACT

Methods are provided for generating digests of network-related notifications specifically tailored to user's personas and adaptable across multiple timescale frequencies. Specifically, the methods involve obtaining user data of a user associated with an enterprise network and a plurality of network-related notifications. Each of the plurality of network-related notifications relates to network operations or network configurations. The methods further involve determining a network persona of the user in a context of the enterprise network based on the user data and generating a digest of the plurality of network-related notifications based on the network persona. The digest includes a semantic summary for each of the plurality of network-related notifications that is specific to the network persona. The methods further involve providing the digest for performing one or more actions associated with the enterprise network.

20 Claims, 8 Drawing Sheets

(51) Int. Cl.
*G06F 40/30* (2020.01)
*H04L 41/0654* (2022.01)
*H04L 41/16* (2022.01)

(56) References Cited

U.S. PATENT DOCUMENTS

| | | | | |
|---|---|---|---|---|
| 10,038,611 | B1* | 7/2018 | Wu | H04L 43/08 |
| 11,182,748 | B1* | 11/2021 | Neckermann | G06N 5/022 |
| 11,501,252 | B1* | 11/2022 | Warrier | G06F 16/9535 |
| 12,002,059 | B2* | 6/2024 | Amthor | G06Q 30/018 |
| 2009/0313562 | A1* | 12/2009 | Appleyard | H04L 41/0253 |
| | | | | 715/764 |
| 2013/0081141 | A1* | 3/2013 | Anurag | G06F 21/554 |
| | | | | 726/23 |
| 2016/0103838 | A1* | 4/2016 | Sainani | G06F 16/24 |
| | | | | 707/725 |
| 2016/0283876 | A1* | 9/2016 | Ramaswamy | G06F 40/205 |
| 2017/0001653 | A1* | 1/2017 | Ferencz, Jr. | G16Y 10/40 |
| 2017/0032252 | A1* | 2/2017 | Feminella | G06Q 30/02 |
| 2017/0366440 | A1* | 12/2017 | Sheleheda | H04L 41/0613 |
| 2018/0053207 | A1* | 2/2018 | Modani | G06Q 30/0244 |
| 2018/0123815 | A1* | 5/2018 | Milvaney | H04L 12/1827 |
| 2020/0210647 | A1* | 7/2020 | Panuganty | G06N 3/08 |
| 2021/0064317 | A1 | 3/2021 | Juenger et al. | |
| 2021/0144118 | A1 | 5/2021 | Ratiu et al. | |
| 2021/0144244 | A1 | 5/2021 | Duarte et al. | |
| 2022/0377151 | A1 | 11/2022 | Connelly et al. | |
| 2022/0382736 | A1* | 12/2022 | Beilis | G06F 40/35 |
| 2023/0030262 | A1* | 2/2023 | Springer | H04L 67/55 |
| 2023/0079455 | A1* | 3/2023 | Dasgupta | G06F 16/345 |
| | | | | 707/739 |

FOREIGN PATENT DOCUMENTS

| | | | | |
|---|---|---|---|---|
| WO | WO-2012082615 | A2 * | 6/2012 | A61B 34/10 |
| WO | WO-2021073707 | A1 * | 4/2021 | |

OTHER PUBLICATIONS

Lakshmi S.G., et al., "NLP based Machine Learning Approaches for Text Summarization," Journal of Engineering Sciences, vol. 13, Issue 06, ISSN No. 0377-9254, www.jespublication.com, Jun. 2022, 8 pages.

Lin J., et al., "Overview of the TREC 2016 Real-Time Summarization Track," National Institute for Standards and Technology, Nov. 2016, 14 pages.

OPENAI: "Introducing ChatGPT," https://openai.com/blog/chatgpt, Nov. 2022, 14 pages.

Tang J., et al., "PKUICST at TREC 2017 Real-Time Summarization Track: Push Notifications and Email Digest," Institute of Computer Science and Technology, Peking University, Beijing, Nov. 2017, 4 pages.

Twilio Sendgrid, "The Essential Guide to Email Segmentation," retrieved from https://sendgrid.com/resource/the-essential-guide-to-email-segmentation/, May 12, 2023, 22 pages.

Vuillemot R., et al., "Generalizing Email Messages Digests," CHI 2011, Vancouver, BC, Canada, https://www.researchgate.net/publication/221519007_Generalizing_email_messages_digests, May 2011, 6 pages.

* cited by examiner

PERSONA-BASED MULTI-SCALE NETWORK RELATED DIGEST GENERATION

TECHNICAL FIELD

The present disclosure generally relates to computer networks and systems.

BACKGROUND

Enterprise networks include many assets and involve various enterprise service functions for equipment and software. Enterprise networks are often managed by a team of information technology (IT) specialists. This is particularly the case for enterprises that have large networks or systems of numerous instances and types of equipment and software. Tracking performance, troubleshooting, and integrating new technology and/or updates for networking or equipment and software in large enterprise networks is time consuming and often involves reviewing numerous alerts and informational notices. Moreover, each asset or a group of assets may encounter various issues such as defects, obsolescence, configurations, workarounds, etc. These issues are reported from various vendors and other sources also in a form of notices or alerts. Reviewing various notices and alerts to address issues in the enterprise network and managing the enterprise network is tedious and error prone.

DETAILED DESCRIPTION

Overview

Figure 1:
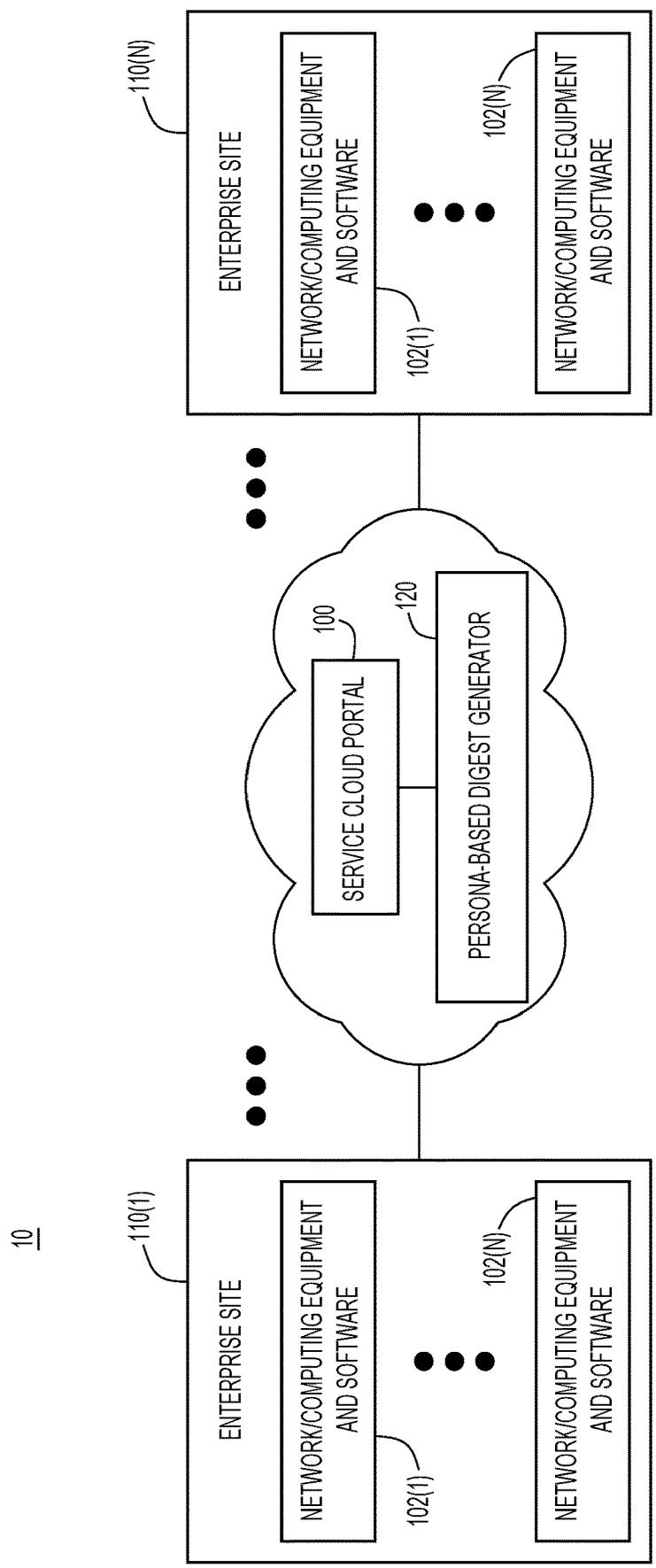
FIG. 1 is a block diagram of a system that includes a persona based digest generator that interacts with an enterprise service cloud portal and network/computing equipment and software residing at various enterprise sites of an enterprise network domain, according to an example embodiment.

Techniques presented herein provide a persona-based digest generator that generates a digest of network-related notifications tailored to user's persona and adaptable across multiple timescale frequencies.

In one form, the methods involve obtaining user data of a user associated with an enterprise network and a plurality of network-related notifications. Each of the plurality of network-related notifications relates to network operations or network configurations. The methods further involve determining a network persona of the user in a context of the enterprise network based on the user data and generating a digest of the plurality of network-related notifications based on the network persona. The digest includes a semantic summary for each of the plurality of network-related notifications that is specific to the network persona. The methods further include providing the digest for performing one or more actions associated with the enterprise network.

Example Embodiments

IT specialists and network users receive numerous notifications. It is difficult for network users to review and process all these notifications. Typically, users do not have the time to sift through each notification being received. In fact, emails and notices are often left unread, which may result in missing relevant information. To address this concern, some notifications are marked "urgent", "important", "please read", etc. Further, some systems generate a digest of emails to provide a compact overview so that the users are less likely to miss relevant information. However, these overviews are typically general and limited.

For example, traditional email digests merely combine basic information such as the subject line or the beginning of the message to create the digest. If important information is not included in the subject line or at the very start of the message, it is omitted from the email digest resulting in users missing important news and/or updates.

Traditional email digests are also inflexible and do not accommodate different timescales. Current general AI-driven summarization models merely use a fixed time window as input, requiring digests to be generated at strict, inflexible times. If a user wants a different time scale (e.g., every week instead of every month), current models have difficulty adapting and may be overhauled and retrained to accommodate the different timescale.

Additionally, the traditional email digests are typically the same regardless of the user's persona. While one email may be relevant to a user A, it may be irrelevant to user B. These differences are not reflected in the traditional email digests. Both users are provided with the same brief overview for each email regardless of relevance to the user. In other words, information provided in the digest disregards user's persona and applies a "one size for all" approach.

Moreover, traditional email digests lack any prioritization e.g., import summaries first, etc. Instead, traditional email digests provide emails based on time received i.e., time-based ordering. With a time-based ordering, users sift through all the emails, even if they are shortened within a digest. This may be problematic when summarizing at larger timescales (e.g., a month of emails). Large timescale digests do not actually save that much time, and still result in lost information and overhead.

While email digests are commonly used to provide an overview of emails, relying on merely aggregating parts of emails instead of semantically summarizing emails, may result in users missing relevant information. Further, traditional email digests that are tailored to public domain (general knowledge information) e.g., email servers, social media feeds, cannot accommodate specifics of managing enterprise networks, for example. The traditional email digests may not be optimal for the network domain.

The techniques presented herein provide for generating a digest that is tailored to the network domain i.e., network and IT management. Specifically, the techniques presented herein generate a digest that includes semantically summarized content of a plurality of notifications using natural language models that are finetuned to the network domain and that incorporate network personas to highlight and prioritize relevant information to the user's persona and/or role within an enterprise network. Moreover, the techniques presented herein generate a digest for different timescales flexibly and on the fly without multiple models or retraining.

Additionally, the techniques presented herein prioritize content of the digest based on user's network persona (i.e., role within an enterprise network) and context of the notifications e.g., action tasks related to configuring the enterprise network are prioritized over information notices. Prioritized notifications have a more focused set of topics that are specifically related to the user's network persona and roles, rather than the broader interests encompassed by a social media user, for example. The techniques presented herein involve generating a digest that is largely relevant to the specific user (albeit with different priority levels).

FIG. 1 is a block diagram of a system 10 that includes a persona-based digest generator 120 that interacts with an enterprise service cloud portal (cloud portal) 100 and network/computing equipment and software 102(1)-102(N) residing at various enterprise sites 110(1)-110(N), or in cloud deployments of an enterprise, according to an example embodiment.

The notations 1, 2, 3, . . . n; a, b, c . . . n; "a-n", "a-d", "a-f", "a-g", "a-k", "a-c", and the like illustrate that the number of elements can vary depending on a particular implementation and is not limited to the number of elements being depicted or described. Moreover, this is only examples of various components, and the number and types of components, functions, etc. may vary based on a particular deployment and use case scenario.

The system 10 is one example of an enterprise network. The system 10 may involve multiple enterprise networks. The network/computing equipment and software 102(1)-102(N) are resources or assets of an enterprise (the terms "assets" and "resources" are used interchangeably herein). The network/computing equipment and software 102(1)-102(N) may include any type of network devices or network nodes such as controllers, access points, gateways, switches, routers, hubs, bridges, gateways, modems, firewalls, intrusion protection devices/software, repeaters, servers, and so on. The network/computing equipment and software 102(1)-102(N) may further include endpoint or user devices such as a personal computer, laptop, tablet, and so on. The network/computing equipment and software 102(1)-102(N) may include virtual nodes such as virtual machines, containers, point of delivery (POD), and software such as system software (operating systems), firmware, security software such as firewalls, and other software products. The network/computing equipment and software 102(1)-102(N) may be in a form of software products that reside in an enterprise network and/or in one or more cloud(s). Associated with the network/computing equipment and software 102(1)-102(N) is configuration data representing various configurations, such as enabled and disabled features. The network/computing equipment and software 102(1)-102(N), located at the enterprise sites 110(1)-110(N), represent information technology (IT) environment of an enterprise.

The enterprise sites 110(1)-110(N) may be physical locations such as one or more data centers, facilities, or buildings located across geographic areas that designated to host the network/computing equipment and software 102(1)-102(N). The enterprise sites 110(1)-110(N) may further include one or more virtual data centers, which are a pool or a collection of cloud-based infrastructure resources specifically designed for enterprise uses, and/or for cloud-based service provider uses. Each enterprise site is a network domain, according to one example embodiment.

The network/computing equipment and software 102(1)-102(N) may send to the cloud portal 100, via telemetry techniques, data about their operational status and configurations so that the cloud portal 100 is continuously updated about the operational status, configurations, software versions, etc. of each instance of the network/computing equipment and software 102(1)-102(N) of an enterprise.

The cloud portal 100 is driven by human and digital intelligence that serves as a one-stop destination for equipment and software of an enterprise to access insights and expertise when used and specific to a particular stage of an adoption lifecycle. Examples of capabilities include assets and coverage, cases (errors or issues to troubleshoot), automation workbench, insights with respect to various stages of an adoption lifecycle and action plans to progress to the next stage, etc. The cloud portal 100 helps the enterprise network technologies to progress along an adoption lifecycle based on adoption telemetry and enabled through contextual learning, support content, expert resources, and analytics and insights embedded in context of the enterprise's current/future guided adoption tasks.

A network technology is a computing-based service or a solution that solves an enterprise network or a computing problem or addresses a particular enterprise computing task. The network technology may be offered by a service provider to address aspects of information technology (IT). Some non-limiting examples of a network technology include access policies, security and firewall protection services, software image management, endpoint or user device protection, network segmentation and configuration, software defined network (SDN) management, data storage services, data backup services, data restoration services, voice over internet (VoIP) services, managing traffic flows, analytics services, etc. Some network technology solutions apply to virtual technologies or resources provided in a cloud or one or more data centers. The network technology solution implements a particular enterprise outcome and is often deployed on one or more of the network/computing equipment and software 102(1)-102(N).

An adoption of network technology solution refers to enterprise's uptake and utilization of a network technology for achieving a desired outcome. A journey refers to end-to-end activities performed by an enterprise when adopting a network technology including tasks they perform and defined stages to progress. An adoption lifecycle refers to a step-by-step guidance along the adoption journey to accelerate the speed to value of a network technology. The adoption lifecycle may encompass the end-to-end journey stages of: need, evaluate, select, align, purchase, onboard, implement, use, engage, adopt, optimize, recommend, advocate, accelerate, upgrade, renew, etc.

As noted above, various IT specialists (users) interact with the cloud portal 100 to manage network devices and software of the enterprise. There are many factors for a user to consider when building, operating, and maintaining enterprise network(s) and/or data center(s).

For example, an enterprise network may include dispersed and redundant sites such as the enterprise sites 110(1)-110(N) to support highly available services (e.g., network at various geographic locations). These enterprise sites 110(1)-110(N) include network/computing equipment and software 102(1)-102(N), which may be different hardware and software that host network services may be used for the enterprise services (e.g., product families, asset groups). Different types of equipment run different features and configurations to enable the enterprise services.

Moreover, each device or group of devices may encounter various issues. In one example embodiment, these issues involve network related problems or potential problems. Network related problems may involve an outage, a latency problem, a connectivity problem, a malfunction of the network device or software thereon, and/or incompatibility or configuration related problems. In one example embodiment, issues may involve defects, obsolescence, configurations, workarounds, network patches, network information, etc. Issues may relate to warranties, licenses, or may be informational notices e.g., for a particular configuration or upgrade.

Network related issues are typically provided in a form of network-related notifications. A network-related notification includes technical details or information such as a brief description of the issue, its impact on an affected network device(s) and/or an enterprise service, a detailed description of the issue, and how to mitigate the issue. Network-related notifications are advisories, reports, field notices, alerts, posts, etc. from various vendors and other sources. The network-related notifications may be provided via email, an Internet post, an in-system notification e.g., in the cloud portal 100 and/or directly provided to an enterprise network via a subscription service, for example. That is, the network-related notifications are provided using different channels (e.g., emails, text notifications, direct by subscription, internet posts, in-system alerts, etc.) The network-related notifications may be documents, text or executable files, etc. Network-related notifications include data such as text, images, videos, links, configuration commands, etc. Some network-related notifications may be a text paragraph while others may include multiple pages of content with a computer executable code and comments.

For example, a first network-related notification may be a document that covers one or more defects detected in affected network devices or software (e.g., a network service). A second network-related notification may be an internet post that describes a security related issue and how to reconfigure the network device to mitigate a detected security vulnerability. A third network-related notification may be an email that describes best practices and preferred configurations for a network asset such as the network device. A fourth network-related notification may be a product guide (a pdf file) that describes general conditions that could adversely affect an enterprise network or one or more of its assets (network devices and/or network services). A fifth network-related notification may be an information notice to states that a software upgrade A was installed on affected assets of an enterprise network. These are some non-limiting examples of various network-related notifications encountered by an enterprise network.

While example embodiments relate to network-related notifications, the disclosure is not limited thereto and maybe applied to other domains e.g., technology related domains. The techniques presented herein are tailored to learn the nuances of a particular domain and user's role within the domain and tailor the digest specific to the user's role, semantic meanings in the domain, and flexibility adopt the model to various timescale frequencies.

Enterprises (e.g., IT specialists) monitor the enterprise network to ensure that the enterprise network remains secure and effective to run the enterprise services. The enterprises review notifications, determine if the notifications apply to their enterprise network and how (which site, which network devices, etc.), and determine whether actions may be taken with respect to the configuration of the enterprise network and/or one or more of the potentially affected network devices. It is difficult, time consuming, and error prone for an enterprise to analyze and manage notifications.

Moreover, because of the complexities of the network topology or structure (e.g., multiple network domains, diverse network devices and network services) and vast number of notifications, it is difficult to comprehend effectiveness of network services and/or vulnerabilities of the enterprise network and its network devices. It is difficult to comprehend which network related issues may impact an enterprise network and to generate an actionable plan for improving the enterprise network (mitigating network related vulnerabilities).

Simply aggregating vast amount of information for an enterprise network is unworkable and likely to overwhelm users. Providing first few lines of each notification may be misleading and result in users missing relevant information. Further, users may receive information via different channels and review various notifications in different places (e.g., emails, in-system notifications, texts, web posts, etc.), which may result in users missing information. It is challenging to sort through numerous notifications at various places.

To address at least some of these challenges, the persona-based digest generator 120 generates a digest of network-related notifications based on user's persona. In this digest, content of the network-related notifications is semantically summarized and fine-tuned to the network domain, tailored to the user's role within an enterprise network (i.e., network persona of the user) and is prioritized based on the user's network persona and other criteria (e.g., importance of the content, urgency, criticality, number of impacted network assets, etc.). The persona-based digest generator 120 flexibly adopts the digest to different timescale frequencies, which may be input by the user.

Specifically, the persona-based digest generator 120 generates an individual summary for each of the plurality of network-related notifications by performing natural language machine processing specific to network domain semantics and tailored to the network persona of the user.

For example, in a case of emails, instead of generating digests using basic information like subject lines or merely extracting parts of email body text to display, the persona-based digest generator 120 uses semantic summarization of entire email content. By using an encoder-decoder based transformer, semantic meaning of the email is extracted that is fine-tuned to the network domain, generating a more cohesive and comprehensive overview of the email. Based on the foregoing, the user views actionable items or actionable tasks first without needing to dig through the email and find these items on their own. Users may understand the relevance and importance of the emails instead of being forced to either glean meaning from cherry-picked chunks of data from the email or spend extra time directly reading the emails.

The persona-based digest generator 120 is further configured to flexibly adjust the digest to various timescale frequencies without retraining a model or using a different training model. Different enterprise networks and different use cases may involve summarization at varying timescales and may thus dynamically update the timescale frequency. In the email example, different users may set different timescale frequencies for the digests (e.g., daily or weekly digests). Additionally, these preferences may fluctuate over time (e.g., generate a digest of the last X days since the user was on vacation). The persona-based digest generator 120 flexibly adjusts the digest to different timescales or timescale frequencies, within a single trained model. By doing so, the persona-based digest generator 120 flexibly handles multiple timescales and may be used for a larger variety of use cases while adapting to the users' preferences.

The persona-based digest generator 120 generates content for the digest that is specifically tailored to the network persona of the user. A network persona is user's identity within an enterprise network and includes user's role within the enterprise network i.e., tasks or activities that the user is to perform for the enterprise network. The network persona may be determined based on a user profile within each enterprise network and/or user's click-through history (activities of the user within each enterprise network). U.S. application Ser. No. 17/973,121, titled "PERSONAS DETECTION AND TASK RECOMMENDATION SYSTEM IN NETWORK", filed Oct. 25, 2022, provides some examples of the techniques that may be used for determining a network persona of the user.

By way of a non-limiting example, a network persona may be a protector, an operator, a decider, a researcher, a planner, or a developer. The operator may focus on asset management such as status and performance of the network equipment and software 102(1)-102(N), whereas the planner may focus on an overall performance of the enterprise network (whether the enterprise has enough resources/assets to perform certain tasks, etc.).

Network persona may further be based on different daily tasks performed by the user depending on the type, size, and job segmentation of their enterprise. For example, the operator may have a network role that focuses on hardware assets of the enterprise or may have a security role that focuses on operating system versions of the enterprise assets. The network persona may thus account for different jobs performed by the user.

The network persona may further be based on different daily tasks performed by the user for different enterprises. For example, the planner may focus on enterprise network's reliability and stability for enterprise A while focusing on increasing the present network workload for enterprise B. The network persona may account for different tasks performed by the user for different enterprises.

Since different users have different network personas within enterprise network(s), the persona-based digest generator 120 generates different digests for users with different network personas. By way of a non-limiting example, a first user A is focused on maintaining and securing the enterprise network, while a second user B is focused on planning and designing the enterprise network. If a security-related email or a software patch notification is received by both users, it is more important to the first user A than the second user B. As such, the digests reflects these differences by highlighting and prioritizing the information that is most relevant to the network persona. Moreover, semantic summary of content in the security-related email or the software patch notification is different for the first user A and the second user B. The persona-based digest generator 120 ensures that the digest adapts to what is relevant to each user based on their respective network persona.

The persona-based digest generator 120 is further configured to prioritize content within the digest. By prioritizing the importance of notifications within the digest allows users to view the most important notifications first. In the example of traditional email digests, time-sorted emails within digests leave users searching around to find the more important information. On the other hand, the digest generated by the persona-based digest generator 120 ensures that users know where to find the most relevant content (urgent or critical information) and what actionable insights to perform. For example, the persona-based digest generator 120 may prioritize one or more actionable tasks that mitigate critical network problems in the enterprise network by placing them in the beginning of the digest while placing information notices towards the end of the digest. Users are thus assured that they review or view relevant or important information first (e.g., by looking at the beginning of the digest). Users can avoid searching within the digest itself to find important information e.g., patches for critical or urgent network issues such as actionable tasks to change the configuration of an enterprise network.

In one example embodiment, one or more actionable tasks relate to configuring or managing the network. Each task includes one or more operations/actions. At least some of the actions may be performed by the persona-based digest generator 120 or by the cloud portal 100 with the persona-based digest generator 120 such as changing a configuration of a particular network device(s), updating software asset(s) to a newer version, etc. The user is then notified that these automated actions were performed. The persona-based digest generator 120 may generate the digest for performing the same action(s) on a group of devices (e.g. that run a particular service of the enterprise or use a particular network technology) such as automatically installing the same security patch for a first network/computing equipment and software 102(1) and a second network/computing equipment 102(N), where the first network/computing equipment and software 102(1) and the second network/computing equipment and software 102(N) are similarly functioning devices located at different enterprise sites.

While one or more example embodiments describe the digest for performing one or more actions associated with the enterprise network with respect to the cloud portal 100, this is just an example. Actionable tasks may involve other services and/or systems. In other words, actionable tasks may or may not involve the cloud portal 100. In one example embodiment, actionable tasks may include a first action that involves a network management platform for a first enterprise site 110(1) and a second action that involves a network controller of the network domain, and a third action that involves a direct connection to one of the network/computing equipment and software 102(1)-(N) at a second enterprise site 110(N). Actionable tasks may include actions that are performed in multiple management platforms and the like.

Figure 2:
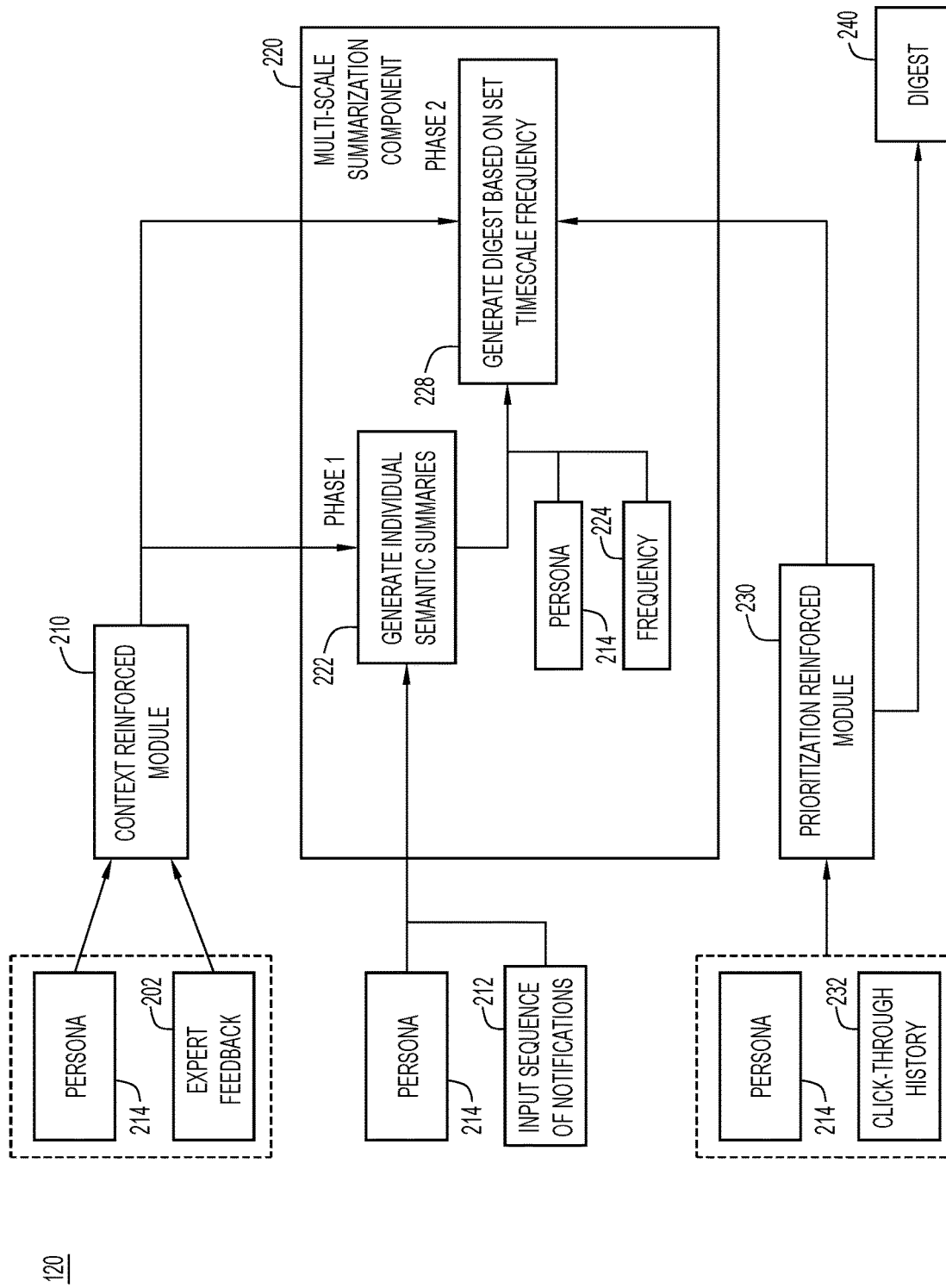
FIG. 2 is a diagram illustrating components of a persona based digest generator that generates a digest based on network-related notifications, according to an example embodiment.

With continued reference to FIG. 1, FIG. 2 is a block diagram illustrating components of the persona-based digest generator 120 of FIG. 1 that generates a digest of a plurality of network-related notifications, according to an example embodiment. The persona-based digest generator 120 includes a context reinforced module 210, a multi-scale summarization component 220, and a prioritization reinforcement module 230.

The persona-based digest generator 120 involves encoder-decoder based transformers that generate a summarization model. The encoder-decoder based transformers seamlessly generate summaries of input network-related notifications for different network personas and vary the summaries across different timescale frequencies.

Specifically, the context reinforced module 210 generates persona specific and expert-tailored ground truth labels for use by the multi-scale summarization component 220 in generating digests. The context reinforced module 210 uses expert feedback 202 and network persona of the user (persona 214) to generate a plurality of network domain labels i.e., network domain related ground truth or global network knowledge base.

The context reinforced module 210 generates network domain semantics specific to each network persona using natural language machine processing and iterative training based on the expert feedback 202. The expert feedback 202 improves network domain persona-specific labels. The context reinforced module 210 applies various natural language processing techniques to a notification and thus generates multiple individual summaries. The multiple individual summaries are ranked, edited, etc. via the expert feedback 202. The individual summary that is most relevant to the persona 214 is selected and input back into the context reinforced module 210 for generating other individual summaries of other network-related notifications.

The network domain labels are specific to each network persona. For example, terminology in the semantic individual summary varies based on the persona 214. As another example, amount of content in the semantic individual summary may be different for different network personas. For instance, for a network security operator, a summary of a network security alert may include one or more actions to perform to fix the security issue on affected devices in the enterprise network (actionable tasks that change a configuration in the enterprise network), whereas for a network planner that focusses on an overall performance of the enterprise network, the summary of the network security alert may include basic information such as a network security issue may be present in devices X and Y of the enterprise network. The network domain labels, generated by context reinforced module 210, form a global knowledge base for generating digests tailored to different network personas.

The multi-scale summarization component 220 generates digests using network domain labels from the context reinforced module 210 for various timescale frequencies. To dynamically adjust the digest to different timescale frequencies, the multi-scale summarization component 220 includes two phases such as a first phase 222 and a second phase 228.

In the first phase 222, the multi-scale summarization component 220 obtains an input sequence of notifications 212 and a network persona of the user (the persona 214). The multi-scale summarization component 220 generates an individual semantic summary for each notification in the input sequence of notifications 212 using the persona 214 and based on network domain semantics from the context reinforced module 210. The individual semantic summaries are generated because the timescale frequency is set to an individual notification level e.g., frequency is set to 1.

In the second phase 228, the multi-scale summarization component 220 uses individual semantic summaries generated in the first phase 222 to generate a digest 240 based on the persona 214 and an input timescale frequency i.e., a frequency 224 (frequency is set to k). By having the two phases, the multi-scale summarization component 220 is adaptable to different time-window requests (timescale frequencies). The frequency 224 may be input by a user or may be a preset default value e.g., setting in the cloud portal 100. The frequency 224 is input into the second phase 228 to generate the digest 240. The first phase 222 remains the same and no new model or retraining may be involved. That is, by having the two-phase training, the multi-scale summarization component 220 extracts semantic information from individual network-related notifications (the input sequence of notifications 212) and combines extracted semantic information depending on the frequency 224 such as daily, weekly, monthly, etc., all of which is performed within a single model without adjusting ground truth labels generated by the context reinforced module 210.

Lastly, the prioritization reinforcement module 230 tailors the ground truth labels for the learning system (the multi-scale summarization component 220) but focuses on prioritizing relevant information within the digest 240 using the persona 214 and a click-through history 232. The click-through history 232 is indicative of user's activity within an enterprise network e.g., links clicked, actionable tasks performed, opened applications, devices reviewed or configured, troubleshooting performed, etc. The click-through history 232 is indicative of user's activity and/or role in the enterprise network.

The prioritization reinforcement module 230 structures content in the digest 240 based on its importance or relevance to the user i.e., the persona 214 and the click-through history 232. The prioritization reinforcement module 230 then provides the digest 240 e.g., as a view in the cloud portal 100 or as an email, a textual message, a file, etc.

In one example embodiment, the persona-based digest generator 120 may change a configuration of one or more affected network devices in the enterprise network by performing the one or more actions provided in the digest 240. In another example embodiment, the persona-based digest generator 120 may provide commands to the cloud portal 100 or directly to the enterprise network to configure affected network resource(s).

In one or more example embodiments, the digest 240 is structured to first provide a first set of actionable tasks that mitigate critical network issues in the enterprise network that the is the responsibility of the user (i.e., determined based on user's historic activity), then provide a second set of actionable tasks that mitigate a non-critical network issue that is the responsibility of the user, then provide a third set of actionable tasks that mitigate a non-critical network issues that is sometimes the responsibility of the user, and then provide information related notices (that have no actionable tasks) last. The information related notices are also organized. For example, information related notices that relate to network issues that are the responsibility of the user are provided first and in a more detailed format (more content) than information related notices that are not directly related to user's activity e.g., relate to an overall network performance, address a licensing issue that the user is not responsible for, etc. In one example embodiment, if an information notice directly relates to a critical network issue that is the responsibility of the user, it is prioritized over non-critical actionable tasks. Thus, the prioritization reinforcement module 230 incorporates additional context and prioritization to further refine the digest 240. The persona 214, the click-through history 232, and the expert feedback 202 may be used to not only improve the quality of the summarization text but are also to refine the prioritization of content within the digest 240.

The persona-based digest generator 120 saves time for the enterprise network and users by providing the digest 240 of the input sequence of notifications 212. The digest 240 aids users in managing the enterprise network and network assets securely and safely because the users are less likely to miss important actionable tasks or information.

Figure 3:
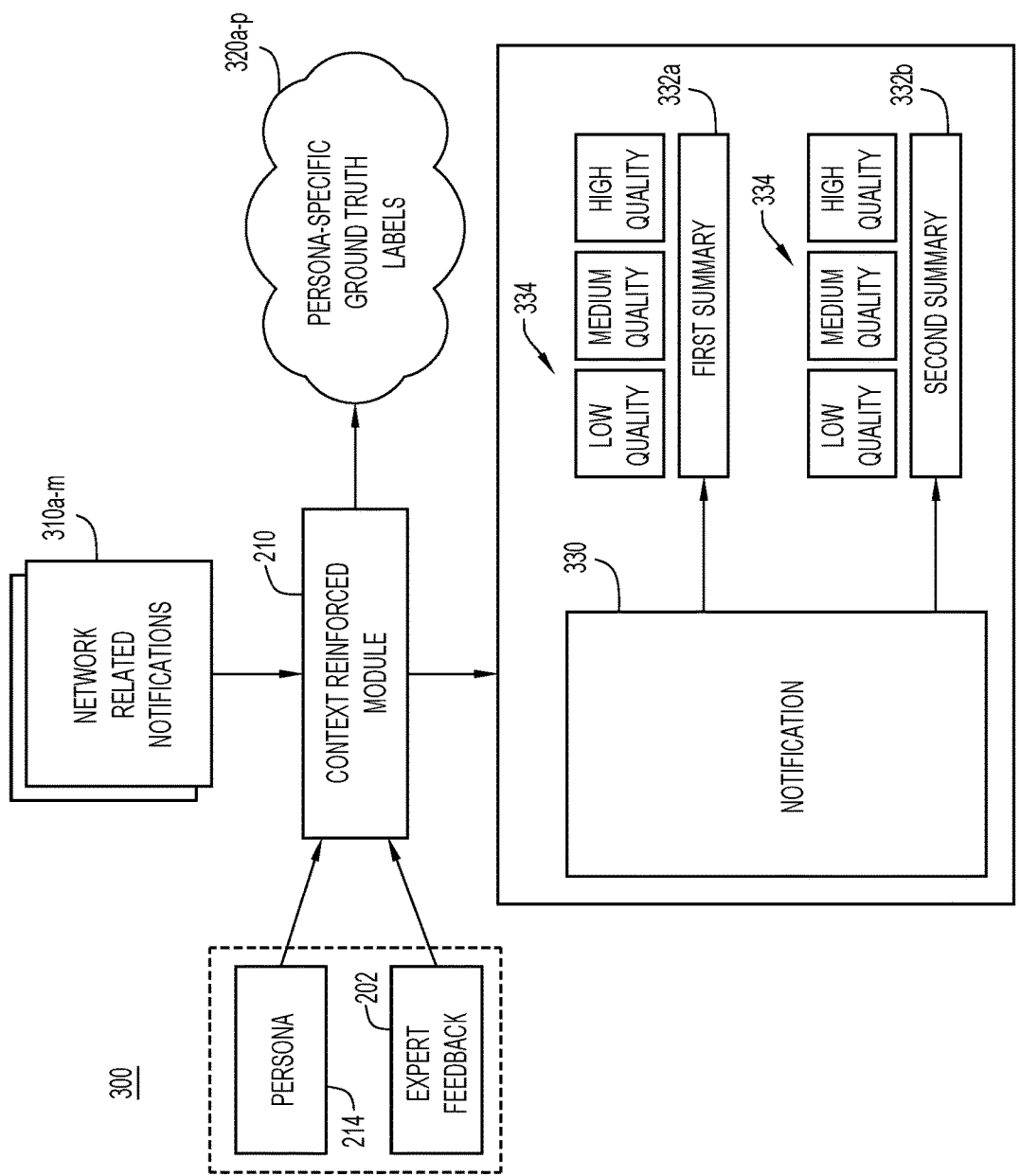
FIG. 3 is a diagram illustrating an environment in which a contextual reinforced module generates an individual semantic summary of a network-related notification, according to an example embodiment.

With continued reference to FIGS. 1 and 2, FIG. 3 is a diagram illustrating an environment 300 in which the context reinforced module 210 of FIG. 2 generates an individual semantic summary of a network-related notification, according to an example embodiment. The environment 300 involves the expert feedback 202, the persona 214, and the context reinforced module 210 of FIG. 2. The context reinforced module 210 generates persona specific and expert-tailored ground truth labels (persona-specific ground truth labels 320a-p) based on network-related notifications 310a-m.

The context reinforced module 210 uses each of the network related notifications 310a-m to generate initial semantic summaries. Specifically, the context reinforced module 210 includes language models that perform natural language machine processing to extract semantic meaning from a respective notification. For example, the language models may include one or more of neural networks and autoregressive language model, bidirectional encoder representations from transformers (BERT) model, decoder-only based transformer model (GPT), encoder-decoder based language model (e.g., T5), etc. The language models may be executed by the multi-scale summarization component 220.

First, individual summaries 332a-b are generated by feeding input network-related notification(s) (e.g., a notification 330) into various language models. For example, the notification 330 relates to an adoption of a network technology in an enterprise network and describes suggestions to accelerate adoption of the network technology in the enterprise network. Specifically, the notification 330 includes current state of the network technology at various network sites, use cases that indicate how far (at which stage) the network technology progressed for each use case. The notification 330 further includes network segmentation policies for the network technology, lifecycle checklist, links to technical online sessions with demonstrations to help advance the network technology to the next stage, one on one tutoring sessions with costs, etc. The context reinforced module 210 generates the individual summaries 332a-b such as a first individual summary 332a and a second individual summary 332b. The first individual summary 332a states that the notification 330 provides current state in the adaption lifecycle of the network technology at various network enterprise sites and for various use cases and the notification 330 further provides help with the adoption of the network technology (progressing along the lifecycle). The second individual summary 332b has less content and states that the notification 330 is about how to accelerate the network technology along the adoption lifecycle.

The context reinforced module 210 incorporates the expert feedback 202 into individual summaries 332a-b to improve the quality of the summarization text and to tailor the summarization to the target enterprise domain. For example, experts may provide ratings 334 of the summarization texts that are then used to guide the persona-specific ground truth labels 320a-p. The ratings 334 may be in a form of low quality, medium quality, or high quality. In one example embodiment, the expert feedback 202 may also involve editing of the individual summaries 332a-b. The edited versions are then used as persona-specific ground truth labels 320a-p.

Additionally, the expert feedback 202 is combined with the persona 214 to further refine the summarizations (the individual summaries 332a-b). The persona 214 helps influence factors such as what semantic information should be extracted and highlighted in the ground truth (e.g., extracting specific security information for security personas). The persona 214 also influences the length of the summarization (e.g., a network manager is provided with a shorter, higher-level overview than other network personas). For example, the first individual summary 332a may be selected for a network manager responsible for the network technology, whereas the second individual summary 332b may be selected for a security operator that does not care about the adoption stage of the network technology. By incorporating the persona 214 into the persona-specific ground truth labels 320a-p, the persona-based digest generator 120 tailors the summarization to each user.

In one or more example embodiments, the context reinforced module 210 ensures that the persona-specific ground truth labels 320a-p incorporate appropriate enterprise and user context. By using the expert feedback 202 and the persona 214, the persona-specific ground truth labels 320a-p are appropriately refined for use in the multi-scale summarization component 220. The persona-specific ground truth labels 320a-p form the global knowledge base that is further refined with each set of network related notifications 310a-m.

Figure 4:
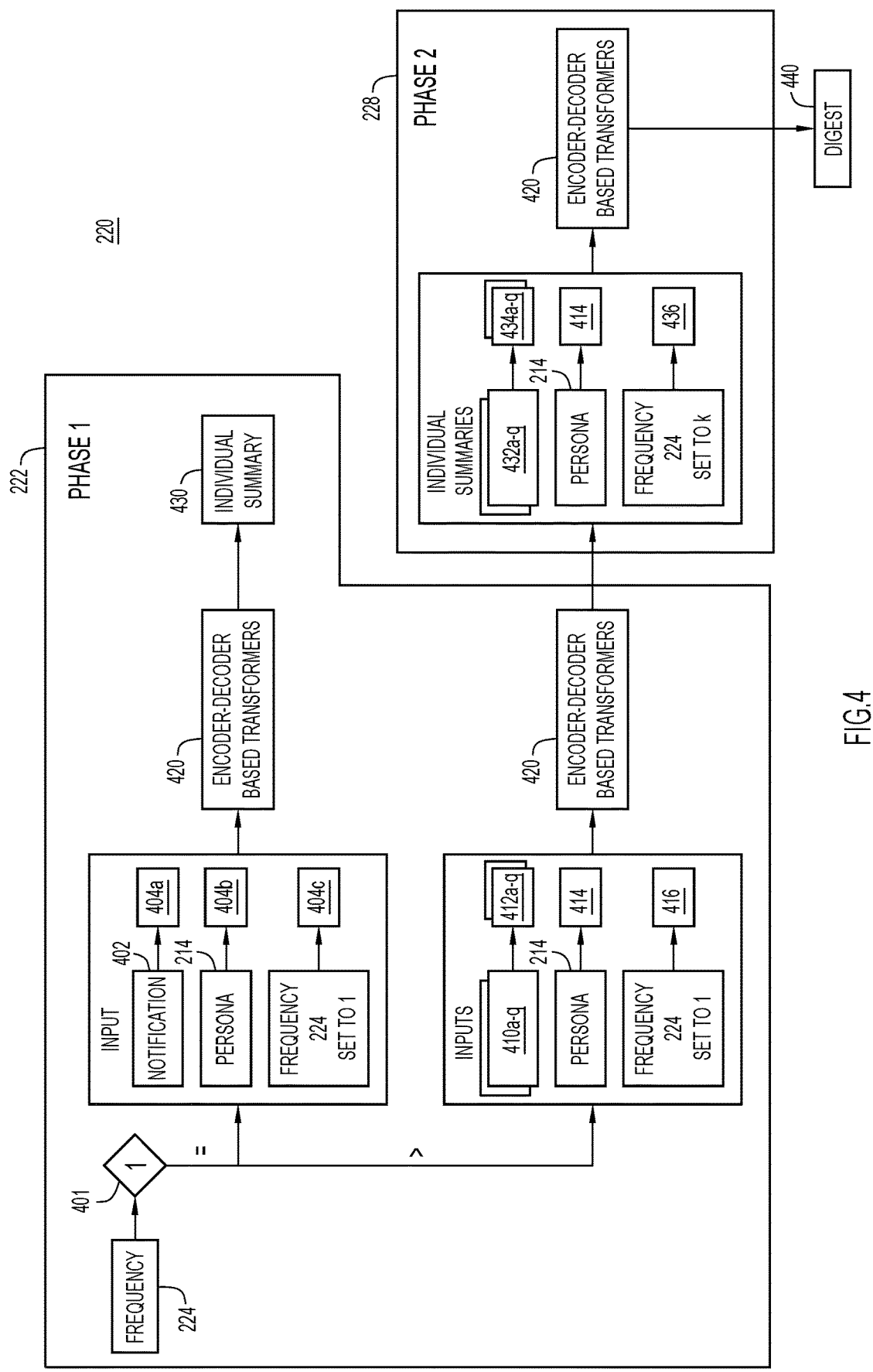
FIG. 4 is a diagram illustrating a multi-scale summarization component that generates digests for different timescales, according to an example embodiment.

With continued reference to FIGS. 1 and 2, FIG. 4 is a diagram illustrating a multi-scale summarization component 220 of FIG. 2 that generates digests for different timescales, according to an example embodiment. The multi-scale summarization component 220 includes the first phase 222 and the second phase 228 that use the persona 214 and the frequency 224 of FIG. 2 and encoder-decoder based transformers 420 to generate an individual summary 430 of an input notification 402 and to generate a digest 440 of inputs 410a-q.

While in one example embodiment the multi-scale summarization component 220 uses encoder-decoder based transformers 420 to summarize notifications 410a-q at different time scales, other language models may be used to summarize notifications 410a-q. That is, the encoder-decoder based transformers 420 may be a different language model such as a generative learning model, an encoder-only or decoder-only language models (BERT or GPT-style language models), etc.

In one or more example embodiments, the inputs 410a-q includes a plurality of network-related notifications that may be obtained via different communication channels such as a data network (Internet) and/or a cellular network. The network-related notifications may be a batch of emails, in-app notifications (e.g., notifications in the cloud portal 100), a batch of text messages, a batch of voice messages, direct notifications on a user's endpoint device, etc. For example, the inputs 410a-q may include a batch of emails in combination with in-app notifications and text messages. The digest 440 may serve as a one stop destination to review network-related notifications obtained via different communication channels.

The multi-scale summarization component 220 obtains the inputs 410a-q, the persona 214, and the desired time frequency (the frequency 224) to summarize at a daily timescale frequency, a weekly timescale frequency, a monthly timescale frequency, etc. The persona 214 is used to tailor the summarization so that the digest 440 highlights the relevant information to the user in a context of the enterprise network. The frequency 224 is set to match the appropriate level of summarization based on the use case and/or the user's desired frequency of summarization.

Specifically, if the frequency 224 is set to an individual notification level, shown at 401 as the frequency 224 is equal to 1, in the first phase 222, the multi-scale summarization component 220 obtains the input notification 402, the persona 214, and the frequency 224 set to 1 and converts them to embeddings 404*a-c* such as a notification embedding 404*a*, a persona embedding 404*b*, and a frequency embedding 404*c*. The embedding 404*a-c* are input into the encoder-decoder based transformers 420 that perform natural language deep learning (e.g., neural networks) to generate the individual summary 430. During training (when the model is trained), individual-level summarizations (e.g., the individual summary 430) are modified by the context reinforced module 210 to further improve summarization results. As a result, when the multi-scale summarization component 220 is deployed for its use case, the multi-scale summarization component 220 outputs individual level summarizations that are refined by the context reinforced module 210.

For other time frequencies (e.g., daily, weekly, monthly, ten days, etc.), the multi-scale summarization component 220 operates similarly but involves two-phases: the first phase 222 and the second phase 228.

In the first phase 222, the multi-scale summarization component 220 operates similarly to the individual email frequency use case. In the first phase 222, inputs 410*a-q* (network related notifications e.g., a batch of emails) are processed individually. Each individual input (e.g., email in the batch) is used as input alongside the persona 214, and the frequency 224 set to 1 (individual-level frequency). These inputs 410*a-q* are converted to notification embeddings 412*a-q*. The persona 214 is encoded into a persona embedding 414 and the frequency 224 is encoded into a frequency embedding 416. The notifications embeddings 412*a-q* are then input into the encoder-decoder based transformers 420 along with the persona embedding 414 and the frequency embedding 416 to generate individual summaries 432*a-q* for the inputs 410*a-q*. The first phase 222 outputs a batch of individual summaries 432*a-q* corresponding to a batch of input emails, for example. The individual summaries 432*a-q* are specific to the persona 214.

In the second phase 228, the multi-scale summarization component 220 obtains the individual summaries 432*a-q* (from the first phase 222), the persona 214, and a set frequency (i.e., the frequency 224 is set to k such as daily, weekly, predetermined number of days, monthly, etc.). In second phase 228, the individual summaries 432*a-q* are encoded to generate individual summaries embeddings 434*a-q*. Similarly, the persona 214 is encoded into the persona embedding 414 and the frequency 224 is encoded into a time frequency embedding 436. These embeddings are then input into the encoder-decoder based transformers 420, which may be the same model that is used in the first phase 222. That is, only a single model (e.g., the encoder-decoder based transformers 420) is trained, which is then used in both the first phase 222 and the second phase 228. In the first phase 222, the trained summarization model specifically targets for k=1 (i.e., only generates individual summarizations e.g., individual email summary). In the second phase 228, the k value is changed to accommodate multiple individual notification (e.g., multiple individual emails). In other words, the language model is the same in first phase 222 and the second phase 228, only the parameters are updated. By only changing the frequency embedding 416 to the time frequency embedding 436 (for a value k), the same model is adapted to different multi-scale environments. To accommodate different timescale frequencies, the frequency 224 is encoded to generate the time frequency embedding 436 and is input into the same model (the encoder-decoder based transformers 420).

The encoder-decoder based transformers 420 then output a digest 440 that represents a semantic summary of content in the inputs 410*a-q* e.g., semantic summary of information in the batch of emails, at the desired summarization timescale frequency. When training, the digest 440 is modified by both the context reinforced module 210 to tailor and refine the summarization text and the prioritization reinforcement module 230 to prioritize relevant information to each specific user. Thus, when the persona-based digest generator 120 is deployed, the digest 440 includes an accurately summarized and prioritized content from multiple network-related notifications that is specifically tailored to the network persona of a user and can be used directly.

Figure 5:
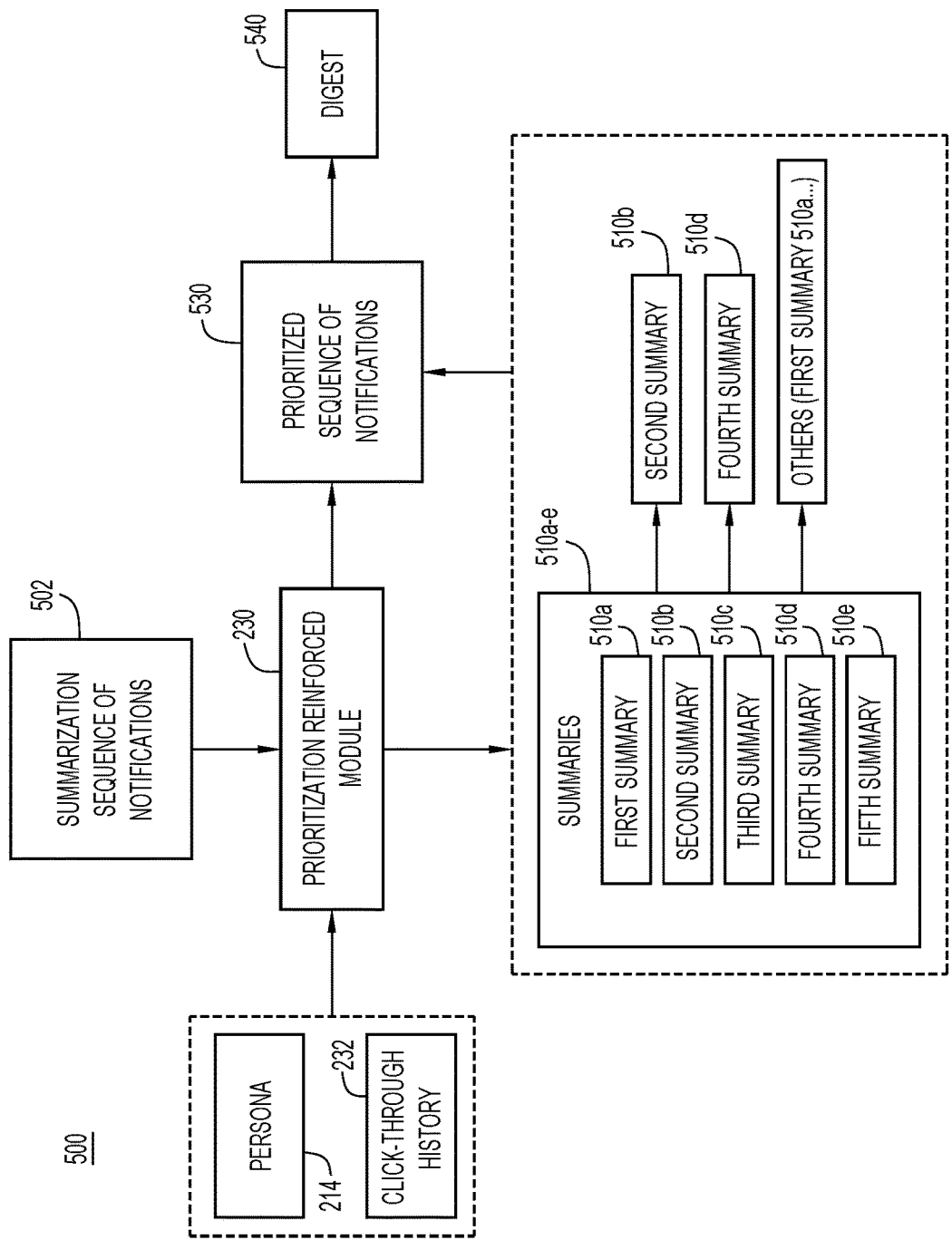
FIG. 5 is a block diagram illustrating an environment in which the prioritization reinforced module prioritizes network-related notification summaries in a digest, according to an example embodiment.

With continued reference to FIGS. 1 and 2, FIG. 5 is a block diagram illustrating an environment 500 in which the prioritization reinforcement module 230 of FIG. 2 prioritizes notification summaries in a digest, according to an example embodiment. The prioritization reinforcement module 230 receives as input the persona 214 of a user and the click-through history 232 indicative of the activity of the user. The prioritization reinforcement module 230 reorganizes content in a summarization sequence of notifications 502 and generate a prioritized sequence of notifications 530 for a digest 540.

The prioritization reinforcement module 230 tailors the ground truth labels for the multi-scale summarization component 220 to prioritize relevant information and provided in the beginning or at the top of the digest 540. The prioritization reinforcement module 230 uses the persona 214 of the user and the click-through history 232 of the user to understand what types of information to be highlighted or prioritized. While example embodiments described below explain refining of the prioritization order of the sequence of the notification summaries, this is just an example. One or more example embodiments, may use other techniques such as highlighting, underlining, color-coding, text size, text font, etc. to indicate prioritization of content in the digest 540.

First, the prioritization reinforcement module 230 obtains a summarization sequence of notification (e.g., individual email summaries) as input. Then, the persona 214 and the click-through history 232 are incorporated to reorder and rank the summarization sequence of notifications 502 to the prioritized sequence of notifications 530 for the digest 540.

For example, emails that involve actionable items, notices, or other relevant information to the persona 214 (e.g., security notices for a security persona) are ranked at the top of a sequence in the prioritized sequence of notifications 530. Additionally, the click-through history 232 may be used to identify past emails that may be similar to emails in the summarization sequence of notifications 502 and determine (based on the past activity) how relevant the input emails are to the user.

As another example, the summarization sequence of notifications 502 includes network related notification summaries (summaries 510*a-e*) such as a first summary 510*a*, a second summary 510*b*, a third summary 510*c*, a fourth summary 510*d*, and fifth summary 510*e*. The first summary 510*a* indicates: "Security product X: learn features and capabilities, begin setup and integration, invite and manage users and assign access privileges within the enterprise network. Integrate and configure security modules of security product X. Configure integration modules so the data and responses are available in the security product X." The second summary 510*b* states: "join ask an expert session designed to help take full advantage of security endpoint product. Join community for quick tips and expert answers, email xxx@abc.com." The third summary 510*c* states: "Activate at least five native data network applications and have at least 95% of your purchased licenses actively in use. Learn about key integrations or work one on one with a specialist." The fourth summary 510*d* indicates: "Activate secure automated wireless access network (WAN). To get started, perform actions A, B, C, to activate an unused license, unlock all security features of for the WAN." The fifth summary 510*e* states: "If you have eight or eight hundred switches X, monitoring service can help scale support faster, provide visibility of switch infrastructure, plus details statistics for network traffic through these switches."

Based on the persona 214 and the click-through history 232 of the user (e.g., use is a network security administrator that is responsible for security endpoint products and network security based on past activity), the prioritization reinforcement module 230 may then reorder the summaries 510*a-e* as follows: first provide the second summary 510*b* and emphasize the email address in the content of second summary 510*b*, and next provide the fourth summary 510*d* and emphasize actionable tasks A, B, C. The first summary 510*a*, third summary 510*c*, and fifth summary 510*e* appear less relevant to the user and may be provided towards the end of the digest 540.

Once this re-ordering has been achieved, the prioritization reinforcement module 230 outputs the digest 540 that contains content from the summarization sequence of notifications 502 but in the prioritized sequence of notifications 530. Additionally, the order of information in the digest 540 (i.e., the sentence ordering) reflects the prioritized ranking of the emails. Thus, the digest 540 includes content of individual summaries but with more relevant information (specifically to the user) occurring earlier in the digest 540.

By way of an example, the digest 540 may be a multi-scale email digest generated at a user's desired time frequency. The users set the timescale frequency for the digest 540 to daily, weekly, biweekly, while on vacation, etc. Then, emails are batched at the set time frequency and used as input alongside the network persona of the user, which may be determined through other associated information such as user experience portals, user profiles, user's activities, etc. With this information, a digest of emails at the set timescale frequency is generated by persona-based digest generator 120 and provided to the user via an email, for example. The digest of emails has the benefits of including semantic summarization and prioritized information.

Additionally, if the user ever wants to change the time frequency of these digests, the persona-based digest generator 120 accommodates the setting changes because of the two phases in the multi-scale summarization component 220 i.e., no retraining may be involved. Furthermore, the digest settings incorporate custom timescale frequencies such as emails in for X days starting on day Y or all unread emails (i.e., to catchup on overflowing email inbox regardless of the amount of time since the user last viewed their emails). Using the persona-based digest generator 120, users obtain a digest of emails in many useful and flexible ways due to the multi-scale nature of the persona-based digest generator 120.

Figure 6:
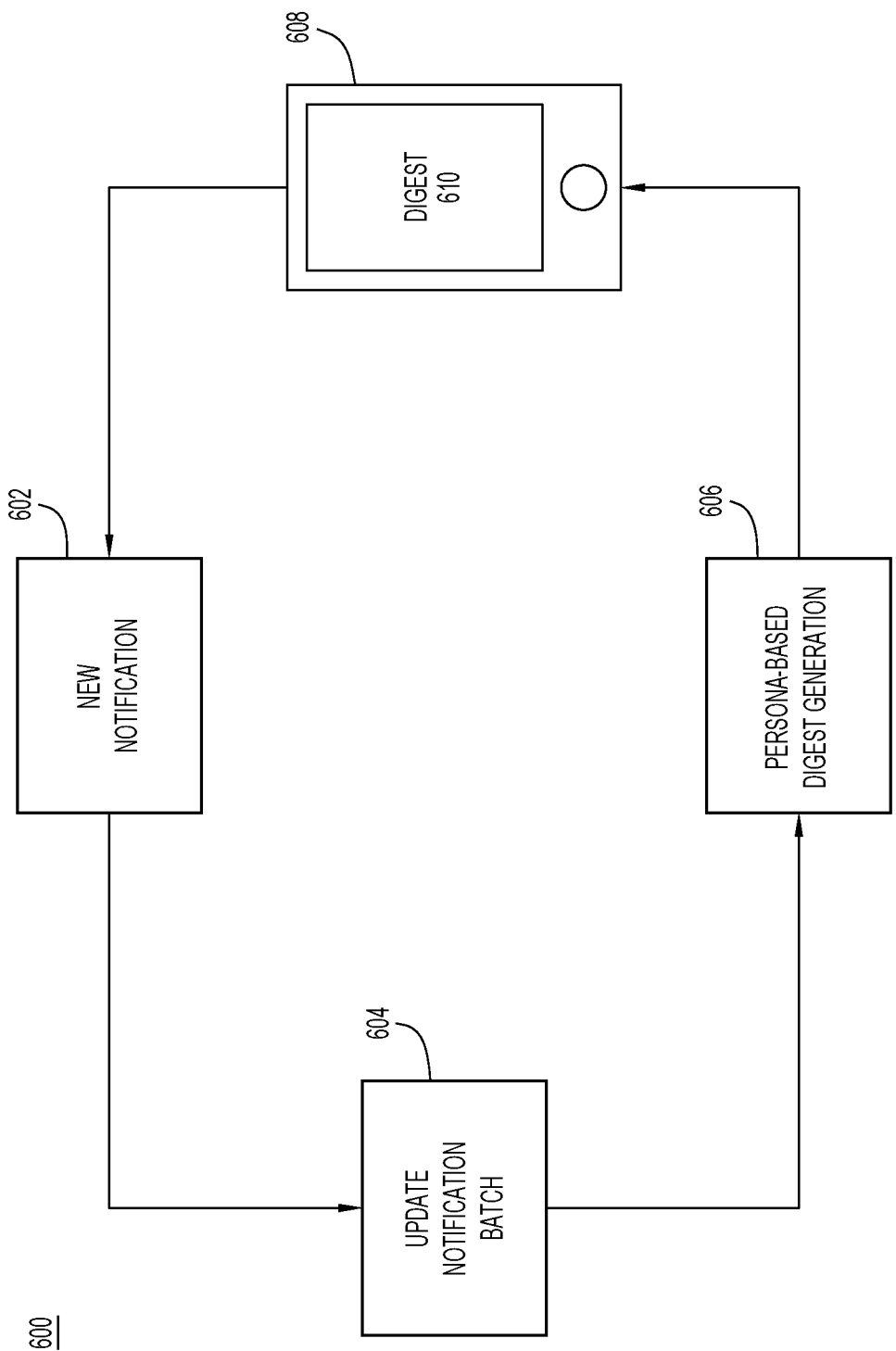
FIG. 6 is a diagram illustrating a method of generating a digest to include new network-related notification(s), according to an example embodiment.

FIG. 6 is a diagram illustrating a method 600 of generating a digest 610 to include new network-related notification(s), according to an example embodiment. The method 600 involves application notifications such as notifications and alerts from the cloud portal 100 of FIG. 1, other network management applications, and/or the enterprise network itself.

Notifications from network-related applications may flood users' devices and make it difficult to find relevant information for the application. Users may receive many notifications. If these notifications are only sorted time-sequentially, users may only view the most recent ones even if the most recent ones are irrelevant or general. Instead, the persona-based digest generator 120 generates the digest 610 (i.e., an in-app digest or a notification overview) in which semantic summaries of most relevant notifications are prioritized. Thus, users are not forced to scroll through all the notifications and dig out important or relevant content.

Network-related application often include context that may help identify network persona of the user such as past activities, user's profile, etc. Using the network persona along with the notifications, the persona-based digest generator 120 generates the digest 610. Additionally, due to the multi-scale nature of the persona-based digest generator 120, various groupings of the notifications may be provided (e.g., weekly, daily, or any other timescale frequency). In one example embodiment, the notification attributes may be used to generate the digest 610 (e.g., unread notifications only, notifications from the cloud portal 100 only, notifications from a network enterprise A only, notifications from a network enterprise site B only, etc.). When the digest 610 is generated, it is provided to a user e.g., displayed within an application such as a dashboard in the cloud portal 100.

Moreover, the multi-scale nature of persona-based digest generator 120 allows the digest 610 to be flexibly updated as soon as the user receives more notifications. Specifically, the method 600 involves at 602, the user receives new notification(s) and at 604, the notification batch is updated i.e., the new notification(s) are added to the stack of existing notifications. At 606, the persona-based digest generation is performed in which the persona-based digest generator 120 uses the multi-scale approach to adopt the digest 610 to include the new notification(s). Specifically, the persona-based digest generator 120 generates individual summaries for the new notification(s) specific to the determined network persona and then applies the preset timescale frequency to generate an updated notification overview, the digest 610, in which most relevant content of the notifications is prioritized. The persona-based digest generator 120 provides the digest 610 to a user device e.g., a mobile device. At 608, the user device displays the digest 610 in an application executing on the mobile device.

The techniques presented herein generate notification digests that tailor summarized information based on the user's network persona, prioritizes content within the digests based on relevance to the user, and flexibly generates digests across different timescales (e.g., days, weeks, months, or any custom time length) without retaining the learning model. The techniques provide users with a quick to read digests and easy to understand actionable items and information that is relevant to them (based on their network persona) regardless of a batch size of input notifications.

The techniques presented herein train network domain ground-truth labels based on the user's network persona and network expert feedback. When individual summaries are generated that focus of semantic analysis is specifically shifted to the user's network persona. Because of this, the persona-based digest generator 120 is trained on target output summaries that match the relevant network information and network personas, ensuring that the digests are high-quality summaries specifically tailored to the user.

Additionally, the techniques presented herein, given different timescales, adapt to those timescales and generate a suitable digest. Typical artificial intelligence (AI) models train on a fixed timescale (e.g., a model only works at a weekly level or at a daily level) and are thus inflexible. If typical AI models are forced to handle a new timescale while it has been trained on a different timescale, the produced results are poor quality output (e.g., summary is too long, content not organized, important information not extracted, etc.). As such, multiple AI models are used i.e., one for a particular timescale, which is time consuming and computationally costly. On the other hand, the techniques presented herein adopt the digest (amount of content, semantic analysis, etc.) to various multiple timescale frequencies without retraining the model or using multiple models.

Figure 7:
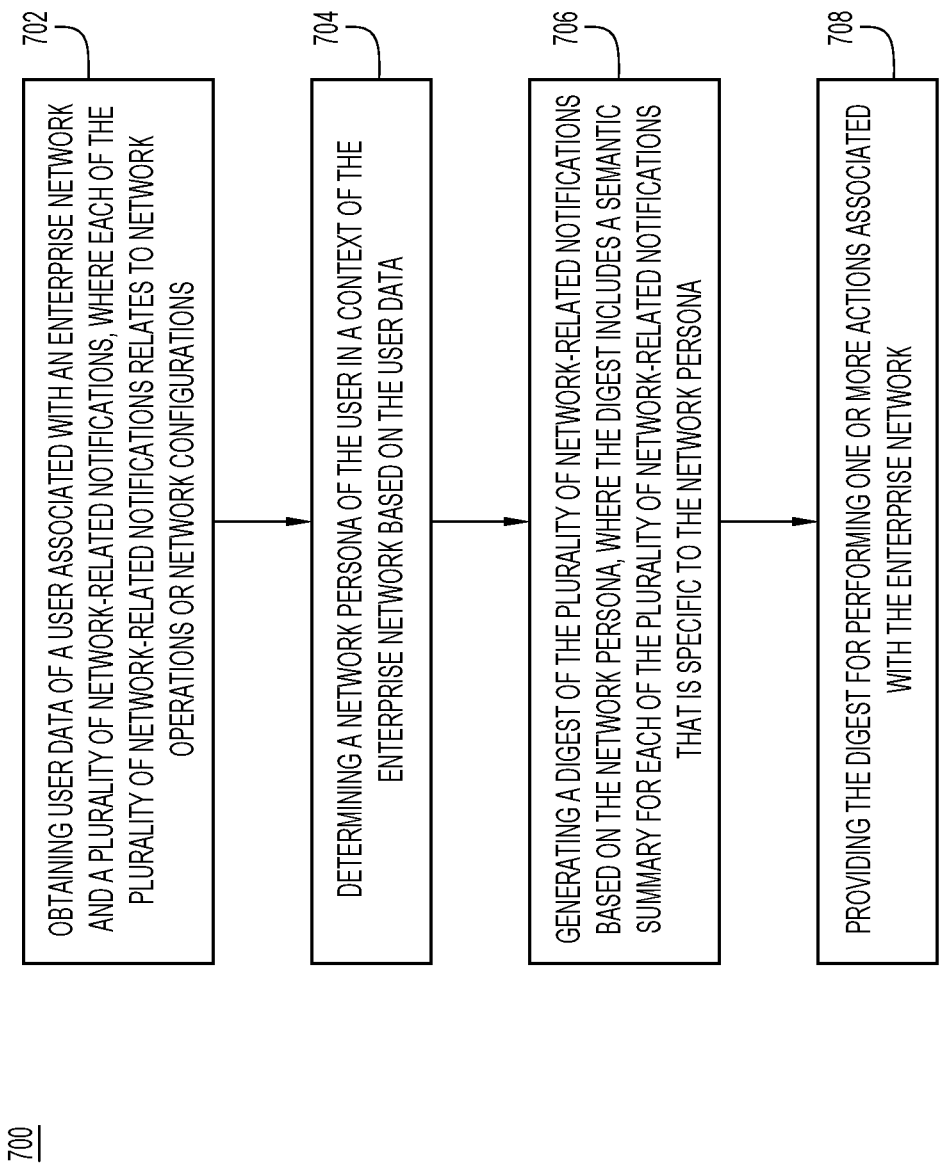
FIG. 7 is a flowchart illustrating a method of providing a digest of network-related notifications for performing one or more actions associated with an enterprise network, according to an example embodiment.

FIG. 7 is a flowchart illustrating a computer-implemented method 700 of providing a digest of network-related notifications for performing one or more actions associated with an enterprise network, according to an example embodiment. The computer-implemented method 700 may be performed by a computing device such as a server or a group of servers that execute the persona-based digest generator 120 of FIGS. 1-6.

The computer-implemented method 700 involves, at 702, obtaining user data of a user associated with an enterprise network and a plurality of network-related notifications. Each of the plurality of network-related notifications relates to network operations or network configurations.

The computer-implemented method 700 further involves at 704, determining a network persona of the user in a context of the enterprise network based on the user data.

The computer-implemented method 700 further involves at 706, generating a digest of the plurality of network-related notifications based on the network persona. The digest includes a semantic summary for each of the plurality of network-related notifications that is specific to the network persona.

Additionally, the computer-implemented method 700 involves at 708, providing the digest for performing one or more actions associated with the enterprise network.

According to one or more example embodiments, a first notification of the plurality of network-related notifications may describe one or more network issues. The computer-implemented method 700 may further include changing a configuration of one or more affected network devices in the enterprise network by performing the one or more actions provided in the digest.

In one instance, the operation 706 of generating the digest of the plurality of network-related notifications may involve generating an individual summary for each of the plurality of network-related notifications by performing natural language machine processing specific to network domain semantics. The individual summary may further be based on the network persona of the user.

In one form, the operation 706 of generating the digest of the plurality of network-related notifications may further include obtaining a timescale frequency for the digest and generating the digest by applying machine learning to a plurality of individual summaries based on the network persona and the timescale frequency.

In another form, the operation 706 of generating the digest of the plurality of network-related notifications may further involve prioritizing content in the digest based on the network persona and a click-through history of the user that is indicative of the one or more actions performed by the user with respect to one or more components of the enterprise network.

According to one or more example embodiments, the operation of prioritizing the content in the digest may include prioritizing one or more actionable tasks in the digest that mitigate one or more network issues in the enterprise network over informational content in the digest.

In one instance, the operation 706 of generating the digest of the plurality of network-related notifications may include encoding each of the plurality of network-related notifications to generate a plurality of respective network notification embeddings and applying machine learning to the plurality of respective network notification embeddings using the network persona and a plurality network domain labels to generate a plurality of individual summaries. The operation 706 of generating the digest of the plurality of network-related notifications may further include encoding the plurality of individual summaries to generate a plurality of respective individual summary embeddings and applying machine learning to the plurality of respective individual summary embeddings using the network persona and a timescale frequency to generate the digest.

According to one or more example embodiments, the digest of the plurality of network-related notifications may be adjustable for at least two different timescale frequencies by applying machine learning to the plurality of respective individual summary embeddings for each of the at least two different timescale frequencies.

In one form, the computer-implemented method 700 may further involve obtaining a new network-related notification and applying semantic machine learning to generate a new individual summary for the new network-related notification. The computer-implemented method 700 may further involve generating the digest to include the new network-related notification by adjusting amount of content in the digest for the plurality of network-related notifications and by prioritizing, in the digest, actionable tasks over information related notifications, of the plurality of network-related notifications and the new network-related notification.

According to one or more example embodiments, the plurality of network-related notifications may include one or more of: an email, an in-application notification, an alert, a text message, or a voice message.

In one instance, the plurality of network-related notifications may be obtained via different communication channels and from different data sources.

Figure 8:
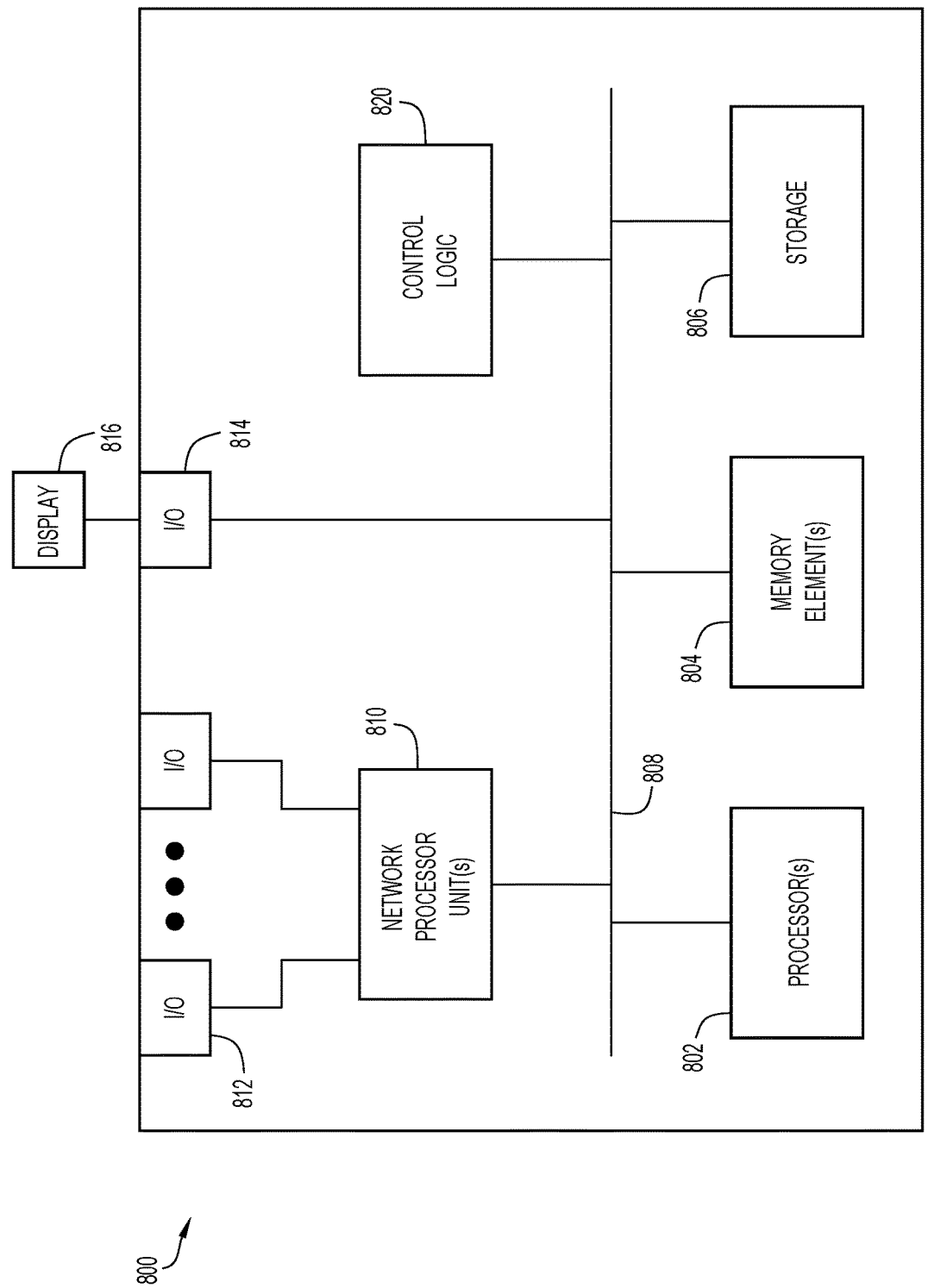
FIG. 8 is a hardware block diagram of a computing device that may perform functions associated with any combination of operations in connection with the techniques depicted and described in FIGS. 1-7, according to various example embodiments.

FIG. 8 is a hardware block diagram of a computing device 800 that may perform functions associated with any combination of operations in connection with the techniques depicted in FIGS. 1-7, according to various example embodiments, including, but not limited to, operations of the computing device or one or more servers that execute the cloud portal 100 and/or the persona-based digest generator 120. Further, the computing device 800 may be representative of one of the network devices, network/computing equipment, or hardware asset of an enterprise. It should be appreciated that FIG. 8 provides only an illustration of one example embodiment and does not imply any limitations with respect to the environments in which different example embodiments may be implemented. Many modifications to the depicted environment may be made.

In at least one embodiment, computing device 800 may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with one or more memory elements 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, and/or any other I/O port(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a display 816 such as a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided. The apparatus includes a memory, a network interface configured to enable network communications, and a processor. The processor is configured to perform a method including obtaining user data of a user associated with an enterprise network and a plurality of network-related notifications. Each of the plurality of network-related notifications relates to network operations or network configurations. The method further involves determining a network persona of the user in a context of the enterprise network based on the user data and generating a digest of the plurality of network-related notifications based on the network persona. The digest includes a semantic summary for each of the plurality of network-related notifications that is specific to the network persona. The method further involves providing the digest for performing one or more actions associated with the enterprise network.

In yet another example embodiment, one or more non-transitory computer readable storage media encoded with instructions are provided. When the media is executed by a processor, the instructions cause the processor to execute a method that includes obtaining user data of a user associated with an enterprise network and a plurality of network-related notifications. Each of the plurality of network-related notifications relates to network operations or network configurations. The method further includes determining a network persona of the user in a context of the enterprise network based on the user data and generating a digest of the plurality of network-related notifications based on the network persona. The digest includes a semantic summary for each of the plurality of network-related notifications that is specific to the network persona. The method further includes providing the digest for performing one or more actions associated with the enterprise network.

In yet another example embodiment, a system is provided that includes the devices and operations explained above with reference to FIGS. 1-8.

The programs described herein (e.g., control logic 820) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 806 and/or memory elements(s) 804 can store data, software, code, instructions (e.g., processor instructions), logic, parameters, combinations thereof, and/or the like used for operations described herein. This includes the storage 806 and/or memory elements(s) 804 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:
   obtaining user data of a user associated with an enterprise network and a plurality of network-related notifications, wherein each of the plurality of network-related notifications relates to network operations or network configurations;
   determining a network persona of the user in a context of the enterprise network based on the user data;
   generating a digest of the plurality of network-related notifications by:
      generating a plurality of individual summaries for each of the plurality of network-related notifications by selecting content for a respective individual summary based on a type of the network persona of the user, and
      generating a semantic summary for each of the plurality of network-related notifications based on the plurality of individual summaries, wherein the digest includes the semantic summary for each of the plurality of network-related notifications based on the type of the network persona of the user; and
   providing the digest for performing one or more actions associated with the enterprise network.

2. The computer-implemented method of claim 1, wherein a first notification of the plurality of network-related notifications describes one or more network issues, and further comprising:
   changing, by a computing device, a configuration of one or more affected network devices in the enterprise network by performing the one or more actions provided in the digest.

3. The computer-implemented method of claim 1, wherein generating the plurality of individual summaries includes:
   generating an individual summary for each of the plurality of network-related notifications by performing natural language machine processing specific to network domain semantics.

4. The computer-implemented method of claim 3, wherein generating the digest of the plurality of network-related notifications further includes:
   obtaining a timescale frequency for the digest; and
   generating the digest by applying machine learning to the plurality of individual summaries based on the network persona and the timescale frequency.

5. The computer-implemented method of claim 3, wherein generating the digest of the plurality of network-related notifications further includes:
   prioritizing the content in the digest based on the network persona and a click-through history of the user that is indicative of the one or more actions performed by the user with respect to one or more components of the enterprise network.

6. The computer-implemented method of claim 5, wherein prioritizing the content in the digest includes:
   prioritizing one or more actionable tasks in the digest that mitigate one or more network issues in the enterprise network over informational content in the digest.

7. The computer-implemented method of claim 1, further comprising:
   obtaining a new network-related notification and applying semantic machine learning to generate a new individual summary for the new network-related notification; and
   generating the digest to include the new network-related notification by adjusting amount of the content in the digest for the plurality of network-related notifications and by prioritizing, in the digest, actionable tasks over information related notifications, of the plurality of network-related notifications and the new network-related notification.

8. The computer-implemented method of claim 1, wherein the plurality of network-related notifications include one or more of: an email, an in-application notification, an alert, a text message, or a voice message.

9. The computer-implemented method of claim 1, wherein the plurality of network-related notifications are obtained via different communication channels and from different data sources.

10. The computer-implemented method of claim 1, wherein generating the semantic summary is further based on a timescale frequency and wherein the semantic summary includes generated network domain semantics specific to the type of the network persona and the semantic summary is different depending on the type of the network persona.

11. A computer-implemented method comprising:
obtaining user data of a user associated with an enterprise network and a plurality of network-related notifications, wherein each of the plurality of network-related notifications relates to network operations or network configurations;
determining a network persona of the user in a context of the enterprise network based on the user data;
generating a digest of the plurality of network-related notifications by:
encoding each of the plurality of network-related notifications to generate a plurality of respective network notification embeddings;
applying machine learning to the plurality of respective network notification embeddings using the network persona and a plurality network domain labels to generate a plurality of individual summaries;
encoding the plurality of individual summaries to generate a plurality of respective individual summary embeddings; and
applying machine learning to the plurality of respective individual summary embeddings using the network persona and a timescale frequency to generate the digest that includes a semantic summary for each of the plurality of network-related notifications that is specific to the network persona; and
providing the digest for performing one or more actions associated with the enterprise network.

12. The computer-implemented method of claim 11, wherein the digest of the plurality of network-related notifications is adjustable for at least two different timescale frequencies by applying machine learning to the plurality of respective individual summary embeddings for each of the at least two different timescale frequencies.

13. The computer-implemented method of claim 11, further comprising:
obtaining a new network-related notification and applying semantic machine learning to generate a new individual summary for the new network-related notification; and
generating the digest to include the new network-related notification by adjusting amount of content in the digest for the plurality of network-related notifications and by prioritizing, in the digest, actionable tasks over information related notifications, of the plurality of network-related notifications and the new network-related notification.

14. The computer-implemented method of claim 11, wherein generating the digest of the plurality of network-related notifications further includes:
prioritizing content in the digest based on a type of the network persona of the user and a click-through history of the user that is indicative of the one or more actions performed by the user with respect to one or more components of the enterprise network.

15. The computer-implemented method of claim 11, wherein a first notification of the plurality of network-related notifications describes one or more network issues, and further comprising:
changing, by a computing device, a configuration of one or more affected network devices in the enterprise network by performing the one or more actions provided in the digest.

16. An apparatus comprising:
a memory;
a network interface configured to enable network communications; and
a processor, wherein the processor is configured to perform a method comprising:
obtaining user data of a user associated with an enterprise network and a plurality of network-related notifications, wherein each of the plurality of network-related notifications relates to network operations or network configurations;
determining a network persona of the user in a context of the enterprise network based on the user data;
generating a digest of the plurality of network-related notifications by:
generating a plurality of individual summaries for each of the plurality of network-related notifications by selecting content for a respective individual summary based on a type of the network persona of the user, and
generating a semantic summary for each of the plurality of network-related notifications based on the plurality of individual summaries, wherein the digest includes the semantic summary for each of the plurality of network-related notifications based on the type of the network persona of the user; and
providing the digest for performing one or more actions associated with the enterprise network.

17. The apparatus of claim 16, wherein a first notification of the plurality of network-related notifications describes one or more network issues and the processor is further configured to perform:
changing a configuration of one or more affected network devices in the enterprise network by performing the one or more actions provided in the digest.

18. The apparatus of claim 16, wherein the processor is configured to generate the plurality of individual summaries by:
generating an individual summary for each of the plurality of network-related notifications by performing natural language machine processing specific to network domain semantics.

19. The apparatus of claim 18, wherein the processor is configured to generate the digest of the plurality of network-related notifications by:
obtaining a timescale frequency for the digest; and
generating the digest by applying machine learning to the plurality of individual summaries based on the network persona and the timescale frequency.

20. The apparatus of claim 18, wherein the processor is configured to generate the digest of the plurality of network-related notifications by:
prioritizing the content in the digest based on the network persona and a click-through history of the user that is indicative of the one or more actions performed by the user with respect to one or more components of the enterprise network.

* * * * *